United States Patent
Ohyama

[15] 3,694,090
[45] Sept. 26, 1972

[54] INSTRUMENT FOR OBSERVING COLORED BUBBLE IMAGE

[72] Inventor: Hideki Ohyama, Yokohama, Japan
[73] Assignee: Nippon Kogaku K.K., Tokyo, Japan
[22] Filed: Oct. 6, 1970
[21] Appl. No.: 78,399

[30] Foreign Application Priority Data
Oct. 6, 1969 Japan ..................... 44/94587

[52] U.S. Cl. ................... 356/148, 33/379, 33/389, 350/112, 356/249
[51] Int. Cl. ............................................... G01c 9/24
[58] Field of Search.......... 356/10, 22, 139, 163, 249, 356/253, 148; 350/110, 111, 112, 113, 30; 33/211

[56] References Cited

UNITED STATES PATENTS

| | | | |
|---|---|---|---|
| 1,034,049 | 7/1912 | Wild | 356/249 |
| 2,373,249 | 4/1945 | Lurcott | 356/10 |
| 2,427,256 | 9/1947 | Butscher | 350/30 |

*Primary Examiner*—Ronald L. Wibert
*Assistant Examiner*—Orville B. Chew, II
*Attorney*—Ward, McElhannon, Brooks & Fitzpatrick

[57] ABSTRACT

A coincidence type bubble image observation instrument including a coincidence prism, a bubble tube and a reflecting plate for confirming the coincidence of the bubble image. A color filter of a colored reflecting plate is placed on one side of the split line in opposed relation with a coincidence prism between a reflecting plate and a bubble tube to coloring only the bubble image.

1 Claim, 5 Drawing Figures

PATENTED SEP 26 1972 3,694,090

INSTRUMENT FOR OBSERVING COLORED BUBBLE IMAGE

BACKGROUND OF THE INVENTION

1. Field of the Invention

The present invention relates to an instrument for observing bubble in which only a bubble image is colored.

2. Description of the Prior Art

In the conventional instrument of the coincidence type, it is very difficult to confirm a bubble image in coincidence because of a low contrast between the images and the field of vision.

SUMMARY OF THE INVENTION

The object of this invention is to overcome the above mentioned difficulty.

In brief, this invention provides an instrument for observing bubble in which a color filter or a colored reflecting plate is placed on one side of a dividing line in opposition to a coincidence prism between a reflector and a bubble tube so that only a bubble image may be colored.

DESCRIPTION OF THE PREFERRED EMBODIMENT

Figure 1:
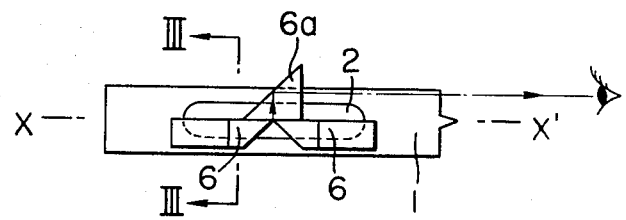
FIG. 1 is a top view of a bubble observation instrument in accordance with the present invention.

One embodiment of the present invention will be described in more detail hereinafter with reference to the accompanying drawing. Reference numeral 1 designates a bubble tube containing a bubble 2 and a liquid 3 such as ethyl or methyl alchohol; 4, a color filter placed below the bubble tube 1 ; 5, an inclined reflecting plate placed below the color filter 4 ; 6, a coincidence prism; and 6a, a prism for displacing the optical path. The axis X—X' designates a split line of the bubble image.

Figure 3:
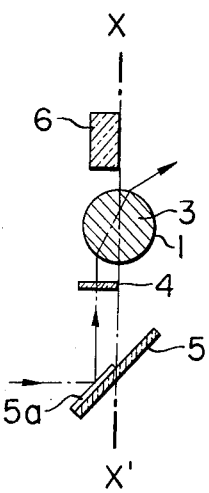
FIG. 3 is a sectional view viewed in the direction indicated by the arrow, illustrating the case in which a bubble image is not viewed in the field of vision.
Figure 4:
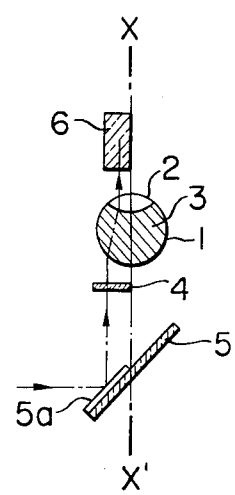
FIG. 4 is a view similar to FIG. 3 illustrating a bubble image is viewed in the field of vision.
Figure 2:
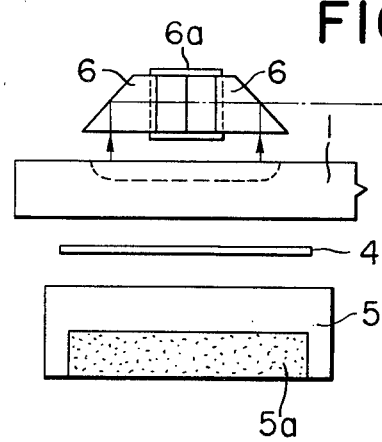
FIG. 2 is a front view thereof.
Figure 5:
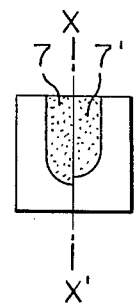
FIG. 5 illustrates the field of observation vision.

The beam of light reflected by the reflecting plate passes through the color filter and then impinges upon the bubble tube. As shown in FIG. 3, when the bubble does not exist in a path of the beam A. the light beam A is not incident upon the coincidence prism 6 owing to the refraction by the liquid 3. That is the bubble tube is not viewed in the field of vision. However, when the bubble 2 is in the path of the light beam B as shown in FIG. 4, the beam of light passing through the color filter 4 is directed toward the coincidence prism 6 because of the refraction by the liquid 3 and the bubble 2. In this case, the bubble 2 colored by the filter 4 may be viewed as shown in FIG. 5, where the bubble images are designated by 7 and 7'.

Instead of the color filter 4, the lower half 5a of the reflecting plate 5 may be colored and the same effect may be attained.

From the foregoing, it is seen that the light beam passing through the bubble is colored while the beam of light not passing through the bubble is not colored, so that the colored bubble image may be viewed in the field of vision with ease.

WHAT IS CLAIMED IS:

1. In a coincidence type bubble image observation instrument, said instrument including a longitudinally elongated bubble tube having a first end and an opposite second end;

a liquid contained in the bubble tube, the liquid having a bubble therein;

a tube illuminating means arranged below the bubble tube for illuminating said liquid and said bubble; and an optical system arranged above the bubble tube, the optical system having a first reflecting surface for reflecting light beam from a portion of said first end, a second reflecting surface for reflecting light beam from a portion of said second end, and an optical component leading said two reflected light beams to the same field of view, convexities of the images in the field being turned in the same direction;

a colored filter disposed between the bubble tube and the illuminating means, whereby the colored light beams from said one end and said second end are incident on the first and second reflecting surfaces, respectively.

* * * * *